Patented Aug. 9, 1938

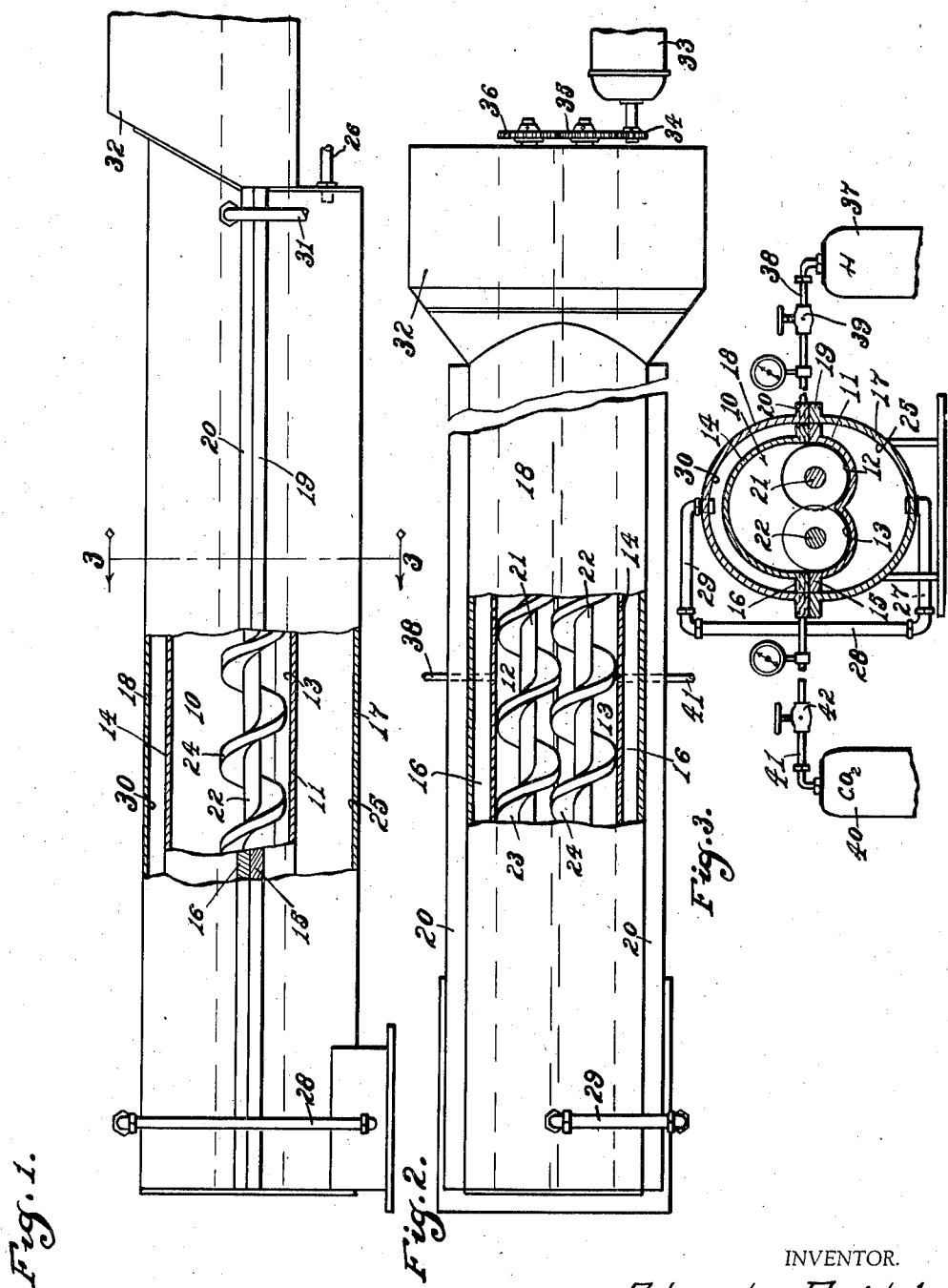

2,126,679

UNITED STATES PATENT OFFICE 2,126,679

METHOD OF PROCESSING CHEESE

Edward Freidel, Syracuse, N. Y., assignor to Kingan & Co. Incorporated, Indianapolis, Ind., a corporation of New Jersey Application May 8, 1936, Serial No. 78,585

12 Claims. (Cl. 99—162)

The present application relates to a method of processing cheese, and more particularly to a method of treating cheese to preserve it.

It has long been known that cheese could be preserved by heating it to a pasteurizing temperature, and in recent years such heat treating has come to be known as "processing"; and the product of such treatment is known as "processed cheese". It is broadly true, however, that, when the cheese reaches a temperature of approximately 110 degrees F., fat separation begins; and the whole mass tends to break down into a sloppy mess consisting of separated melted grease and gummy casein. In the commercial practice of the art of processing cheese, it has always been customary, and has always been considered necessary, to add to a batch of cheese to be processed, emulsifiers which, in most instances, are either sodium phosphate, or sodium citrate mixed with Rochelle salts.

Commercial practice calls for the use of approximately 3% by weight of emulsifying salts. That is, in a batch of approximately 400 pounds of cheese, approximately 12 pounds of salts will be used for emulsification. While at first glance this appears to be a small amount, it is obvious that it must necessarily modify the flavor of the cheese. To bring the percentage down to understandable figures, this percentage of salts amounts to nearly half an ounce per pound of cheese.

Since it has been found to be impossible to "process" cheese commercially without the use of any kind of emulsifying agent, it is the primary object of the present invention to provide a method of "processing" cheese without modifying the flavor of the cheese to any material extent. It is a further object of the invention to supply an emulsifying agent or agents which will not affect materially the flavor of the cheese, when used. A further object of the invention is to render the product of the process more digestible, as well as more palatable, than ordinary "processed" cheese. Further objects of the invention will appear as the description proceeds.

To the accomplishment of the above and related objects, I have illustrated in the accompanying drawing, and shall describe in the present specification, an apparatus through the medium of which my present method can be practiced; but it will be understood that the drawing is illustrative only, and that change may be made in the mechanism illustrated and in the specific steps of the process described, so long as the scope of the appended claims is not violated.

In the accompanying drawing,

Fig. 1 is a side elevation of a machine which may be used in carrying out the process of the present application, parts being broken away for clarity of illustration;

Fig. 2 is a plan thereof, with parts broken away to show the interior construction; and Fig. 3 is a transverse section taken substantially on line 3, 3 of Fig. 1 and looking in the direction of the arrows.

In the drawing, the reference numeral 10 indicates generally a conduit formed of two sections, the lower one 11 of which is formed to provide two part-cylindrical lobes 12 and 13 which are curved upon equal radii, their centers being spaced apart a distance greater than a radius, but less than the sum of their radii. The upper section 14 of the conduit is also part-cylindrical; and the lower section 11 is provided with lateral flanges 15 while the upper section 14 is provided with lateral flanges 16 mating with the flanges 15. It will be seen that, when the two sections 11 and 14 are mated, they cooperate to form a closed conduit. Such conduit is enclosed in a jacket formed by a lower section 17 and an upper section 18, said sections being formed with mating flanges 19 and 20; and the flanges 15 and 16 are welded respectively to the sections 17 and 18. Thus the machine comprises a lower section consisting of the element 11 and the element 17 which, together, form a closed chamber 25; and an upper section comprising the elements 14 and 18 which, together, form a closed chamber 30. There is no direct communication between the chambers 25 and 30, and there is no possible communication between said chambers 25 and 30 and the interior of the conduit 10.

Within the conduit 10 there are mounted two parallel shafts 21 and 22 which are respectively positioned at the centers of curvature of the lobes 12 and 13. The shaft 21 carries a worm 23 and the shaft 22 carries a worm 24, said worms, as is clearly shown in Fig. 2, overlapping.

A steam supply pipe 26 opens into the interior of the chamber 25 adjacent one end thereof; and a pipe 27 provides communication between the other end of said chamber 25 and a pipe 28 which leads, through a pipe 29, to the interior of the chamber 30. A discharge pipe 31 leads from that end of the chamber 30 remote from the pipe 29. An inlet hopper 32 communicates with the interior of the conduit 10.

Suitable means is provided for driving the shafts 21 and 22; and, in the illustrated embodiment of the mechanism, such means comprises a motor 33 carrying a pinion 34 meshing with a gear 35 on the shaft 22, which, in turn, meshes with a gear 36 on the shaft 21.

It will be seen that, if comminuted cheese is fed into the hopper 32, the worms 23 and 24 will operate to knead the cheese and to advance it from the hopper end of the machine to the opposite or discharge end of the conduit 10. Steam is supplied constantly through the pipe 26 to the chamber 25, whereby the lower section of the conduit 10 is heated; and, as said steam gives up its heat in the chamber 25, it will condense and be carried through the pipe line 27, 28, 29, into the chamber 30 where still further heat will be transferred from the hot water in said chamber through the section 14 to the interior of the conduit 10. After the water has given up most of its heat, it is discharged through the pipe 31.

I have found that carbon dioxide has a tendency to emulsify the components of cheese which separate upon heating. My experiments have shown that the emulsifying effect of the carbon dioxide does not appear until the cheese has been heated to a temperature of approximately 110 degrees F. If cheese is passed through the illustrated machine, and if carbon dioxide is injected into the cheese mass and is intimately mixed with the cheese mass while the temperature of the cheese is being elevated from, say, 110 degrees F. to 140 degrees F., a reasonably satisfactory product results.

However, further experiments have shown that, if hydrogen is injected into the cheese mass, its tendency is to inhibit fat separation. If hydrogen is injected into the cheese mass before the temperature of that mass reaches 100 degrees F. (which is the temperature at which fat separation usually begins), I find that fat separation is delayed, and that the emulsifying effect of the carbon dioxide upon the cheese is facilitated and improved.

Furthermore, it is my present opinion that when carbon dioxide is injected into a heated cheese mass, in the presence of hydrogen, the hydrogen has a catalytic effect which makes it possible for the carbon dioxide to react with certain of the insoluble proteins present in the cheese to render those proteins soluble.

At any rate, I have found that the introduction of hydrogen into the heated cheese mass at a point at least as early in the process as the introduction of carbon dioxide, improves both the flavor and the texture of the resulting product. Hydrogen alone has no material effect upon the resultant product; and carbon dioxide alone, although it results in a reasonably satisfactory product, does not give the satisfactory results which are attained by the use of hydrogen and carbon dioxide together. The character of the final product is improved somewhat by the introduction of hydrogen at a point in the process subsequent to the introduction of carbon dioxide; but I find that the most satisfactory results are obtained where the hydrogen is introduced either before the introduction of the carbon dioxide or simultaneously therewith. If desired, the two gases may be blended before the injection into the cheese mass; but I find that eminently satisfactory results may be obtained by introducing the two gases from separate sources, simultaneously. My experiments have indicated that approximately 2% by weight of carbon dioxide should be introduced into 100% by weight of cheese; and that approximately 0.5% of hydrogen should be injected.

In the illustrated mechanism, a cylinder 37 of hydrogen gas is connected through a pipe 38, controlled by a valve 39, with the interior of the conduit 10; and a cylinder 40 of carbon dioxide is connected through a pipe 41, controlled by a valve 42, with the interior of the conduit 10 so that hydrogen and carbon dioxide are simultaneously supplied to the cheese mass flowing through the conduit 10.

While I prefer to practice the process of the present application with apparatus similar to that illustrated, I have found that the process can be satisfactorily practiced in an open kettle. If an open kettle is to be used, the gases are injected into the bottom of the kettle while the cheese is being agitated and melted. The mass is continuously stirred or agitated during the injection of the gas, and is brought to a proper pasteurizing temperature, whereafter it is poured into suitable packages.

I claim as my invention:

1. The method of producing a pasteurized cheese product which comprises the steps of heating a mass of raw cheese, injecting hydrogen into such mass, and injecting carbon dioxide into such mass.

2. The method of producing a pasteurized cheese product which comprises the steps of heating a mass of raw cheese, and injecting into such heated mass quantities of carbon dioxide and hydrogen.

3. The method of producing a pasteurized cheese product which comprises the steps of heating a mass of raw cheese, and injecting into such heated mass quantities of carbon dioxide and hydrogen, substantially in the proportions of four parts by weight of carbon dioxide and one part by weight of hydrogen.

4. The method of treating cheese which comprises the steps of heating a mass of comminuted cheese to a temperature of approximately 110° F., injecting hydrogen into the heated mass, injecting carbon dioxide into the heated mass, and thereafter heating the cheese mass to a pasteurizing temperature.

5. The method of treating cheese which comprises the steps of heating a mass of comminuted cheese to a temperature of approximately 110° F., injecting hydrogen into the heated mass, injecting carbon dioxide into the heated mass in an amount approximately four times, by weight, the amount of hydrogen injected, and thereafter heating the cheese mass to a pasteurizing temperature.

6. The method of treating cheese which comprises the steps of heating a mass of raw cheese and injecting carbon dioxide into the heated mass, but not before the injection into said mass of a quantity of hydrogen equal, by weight, to approximately one-fourth the weight of carbon dioxide used.

7. The method of treating cheese which comprises the steps of heating a mass of raw cheese and injecting into the heated mass approximately two percent, by weight, of carbon dioxide, but not before the injection into said mass of approximately one-half of one percent, by weight, of hydrogen.

8. The method of treating cheese which comprises the steps of heating a mass of raw cheese and injecting thereinto a blended mixture of carbon dioxide and hydrogen.

9. The method of treating cheese which comprises the steps of heating a mass of raw cheese and injecting thereinto a blended mixture of carbon dioxide and hydrogen, in substantially the proportion of four parts of carbon dioxide to one part of hydrogen, by weight.

10. In a cheese-preserving process, the steps of ihibiting fat separation normally resulting from heating raw cheese, by injecting hydrogen into the heated cheese mass, and rendering soluble certain insoluble proteins in the cheese mass and effecting emulsification of the components of the cheese by mixing the heated cheese mass with carbon dioxide in the presence of the hydrogen so injected.

11. In a cheese preserving process, the steps of injecting carbon dioxide into a mass of cheese after bringing the cheese to a temperature above approximately 110° F., and facilitating the tendency of the carbon dioxide to emulsify the components of the cheese and to render soluble certain of the normally insoluble proteins present in the cheese introducing hydrogen into the cheese mass at least as early as the introduction of the carbon dioxide.

12. The method of producing a pasteurized cheese product which comprises the steps of heating a mass of raw cheese to a temperature such as to cause separation of the fats and caseins, and thereafter effecting emulsification of the separated components by injecting carbon dioxide into the heated mass.

EDWARD FREIDEL.